(12) United States Patent
Johnston et al.

(10) Patent No.: US 8,291,658 B1
(45) Date of Patent: Oct. 23, 2012

(54) ELECTRICAL CONDUIT FLASHING SYSTEM

(76) Inventors: Lorne G. Johnston, High River (CA); Mona A. Bareham, High River (CA)

( * ) Notice: Subject to any disclaimer, the term of this patent is extended or adjusted under 35 U.S.C. 154(b) by 795 days.

(21) Appl. No.: 12/276,986

(22) Filed: Nov. 24, 2008

Related U.S. Application Data (60) Provisional application No. 61/004,202, filed on Nov. 26, 2007.

(51) Int. Cl.
*E04H 12/28* (2006.01)

(52) U.S. Cl. ............... 52/219; 52/60; 52/198; 52/220.8; 285/42

(58) Field of Classification Search ............... 52/58, 60, 52/59, 61, 62, 198, 219, 220.8; 285/42–44
See application file for complete search history.

(56) References Cited

U.S. PATENT DOCUMENTS

| | | | |
|---|---|---|---|
| 917,167 | A | 4/1909 | Shaw |
| 2,985,465 | A | 5/1961 | Church |
| 4,211,423 | A | 7/1980 | Resech |
| 4,333,660 | A | 6/1982 | Cupit |
| 4,664,390 | A | 5/1987 | Houseman |
| 4,937,991 | A * | 7/1990 | Orth ............................... 52/199 |
| 5,414,964 | A | 5/1995 | Bodycomb |
| 5,899,034 | A * | 5/1999 | Vermilion et al. .............. 52/219 |
| 5,946,863 | A | 9/1999 | Bullard |
| 5,970,667 | A * | 10/1999 | Thaler ............................. 52/219 |
| 6,327,820 | B1 * | 12/2001 | Picco .................................. 52/58 |
| 6,601,351 | B1 * | 8/2003 | Zerfoss ........................... 52/198 |
| 2002/0108316 | A1 * | 8/2002 | Miller ................................ 52/60 |
| 2006/0283100 | A1 * | 12/2006 | Evensen ............................ 52/58 |

* cited by examiner

*Primary Examiner* — William Gilbert
(74) *Attorney, Agent, or Firm* — Neustal Law Offices (57) ABSTRACT

An electrical conduit flashing system for efficiently replacing existing flashing for an electrical conduit without disconnection of electrical services. The electrical conduit flashing system generally includes a lower cover having a first base, a second base and a third base movably attached to one another, and an upper cover having a pair of mating portions positioned above the lower cover. A grommet may be attached to an upper opening formed within the upper cover to seal the same against the conduit.

20 Claims, 8 Drawing Sheets

ELECTRICAL CONDUIT FLASHING SYSTEM

CROSS REFERENCE TO RELATED APPLICATIONS

I hereby claim benefit under Title 35, United States Code, Section 119(e) of U.S. provisional patent application Ser. No. 61/004,202 filed Nov. 26, 2007. The 61/004,202 application is currently pending. The 61/004,202 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to roof flashing for conduit and more specifically it relates to an electrical conduit flashing system for efficiently replacing existing flashing for an electrical conduit without disconnection of electrical services.

2. Description of the Related Art

Any discussion of the related art throughout the specification should in no way be considered as an admission that such related art is widely known or forms part of common general knowledge in the field.

Flashing is utilized to prevent the passage of water into a building structure at a joint or where conduit extends through the roof of the building structure (e.g. electrical conduit). The flashing is typically constructed of a thin sheet metal and is secured with fasteners (e.g. nails) to the roof along with the utilization of a sealant. Conventional flashing for electrical conduit is comprised of a solid tubular structure that slides over the electrical conduit during installation of the electrical conduit prior to the electrical wires being connected. The problem with conventional flashing for electrical conduit is that it requires disconnecting of the electrical wiring to replace the flashing which is time consuming, dangerous and inconvenient for the homeowner.

Because of the inherent problems with the related art, there is a need for a new and improved electrical conduit flashing system for efficiently replacing existing flashing for an electrical conduit without disconnection of electrical services.

BRIEF SUMMARY OF THE INVENTION

The general purpose of the present invention is to provide an electrical conduit flashing system that has many of the advantages of the roof flashing mentioned heretofore. The invention generally relates to a roof flashing for conduit which includes a lower cover having a first base, a second base and a third base movably attached to one another, and an upper cover having a pair of mating portions positioned above the lower cover. A grommet may be attached to an upper opening formed within the upper cover to seal the same against the conduit.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an electrical conduit flashing system for efficiently replacing existing flashing for an electrical conduit without disconnection of electrical services.

Another object is to provide an electrical conduit flashing system that may be utilized upon various sizes of conduit.

An additional object is to provide an electrical conduit flashing system that may be attached to roofs of various pitches.

A further object is to provide an electrical conduit flashing system that does not require sealant to form a seal around the conduit.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 6 illustrate an electrical conduit flashing system 10, which comprises a lower cover 20 having a first base 21, a second base 22 and a third base 23 movably attached to one another, and an upper cover 30 having a pair of mating portions positioned above the lower cover 20. A grommet 40 may be attached to an upper opening formed within the upper cover 30 to seal the same against the conduit 12.

B. Roof and Conduit.

FIGS. 1 through 4 illustrate an exemplary roof 14 having a base structure typically comprised of wood and a roofing material (e.g. asphalt shingles) covering the base structure. The roof 14 may be comprised of a substantially level structure or at an angle as illustrated in FIGS. 1 through 4 of the drawings.

Figure 1:
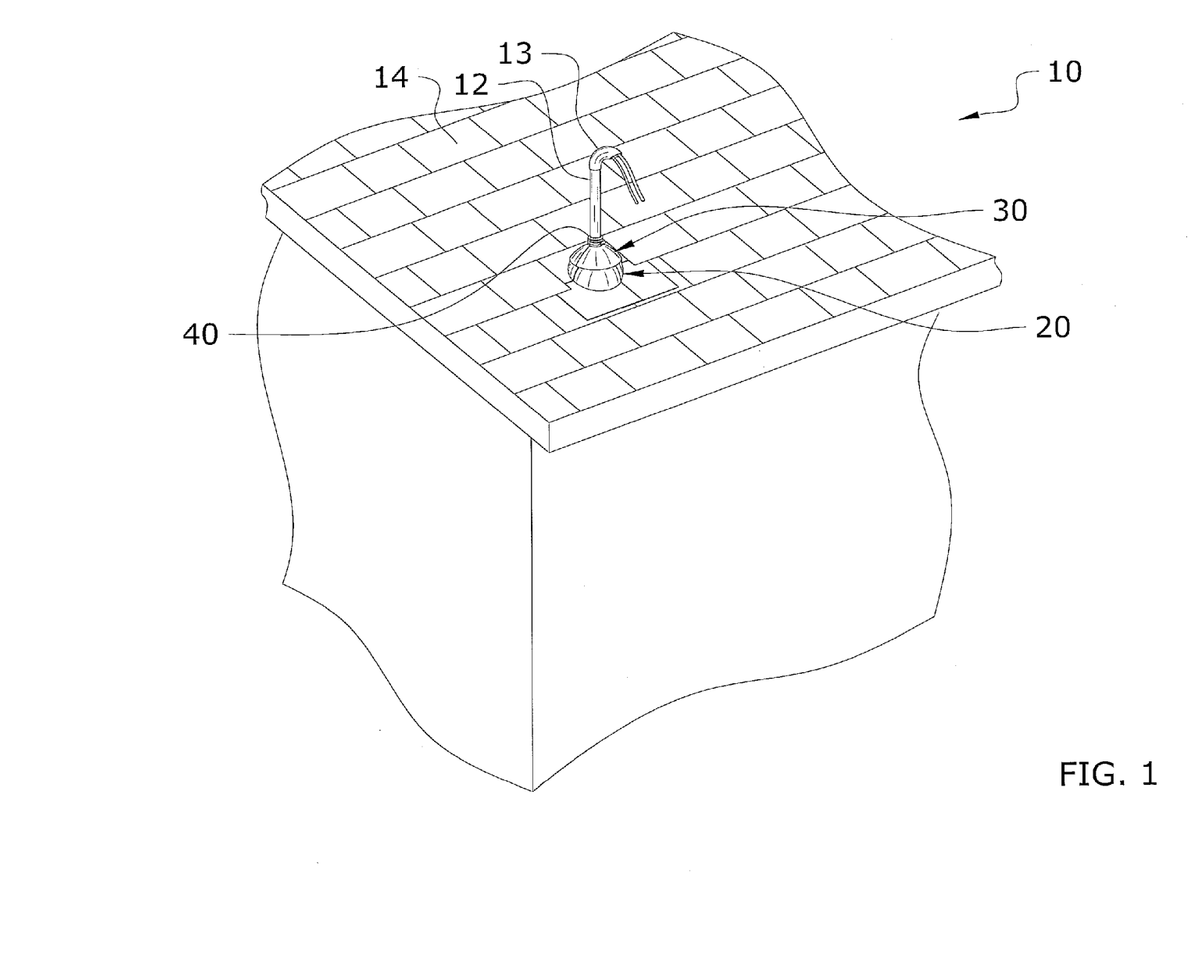
FIG. 1 is an upper perspective view of the present invention installed about electrical conduit.
Figure 2:
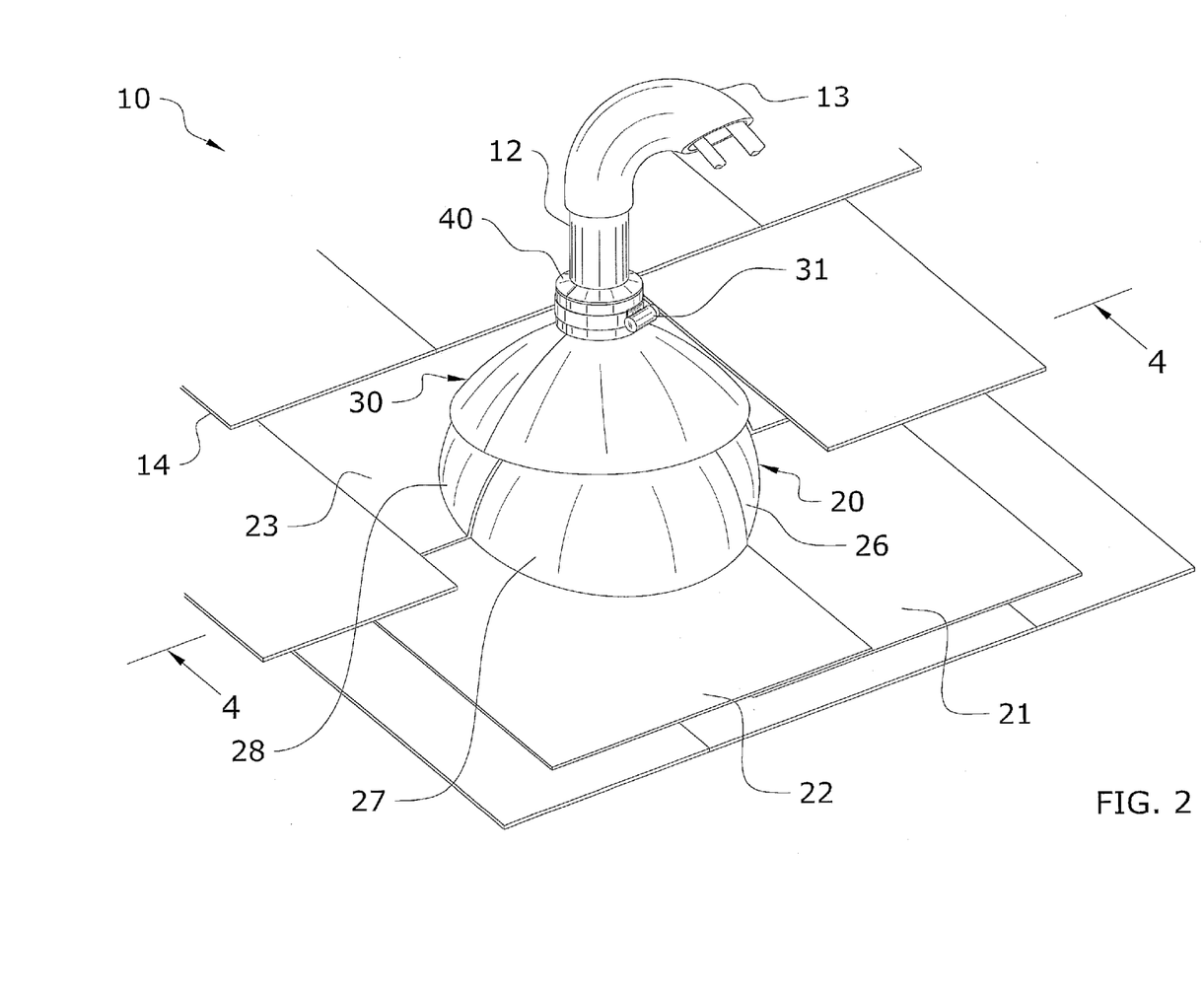
FIG. 2 is a magnified upper perspective view of the present invention installed upon electrical conduit.
Figure 3:
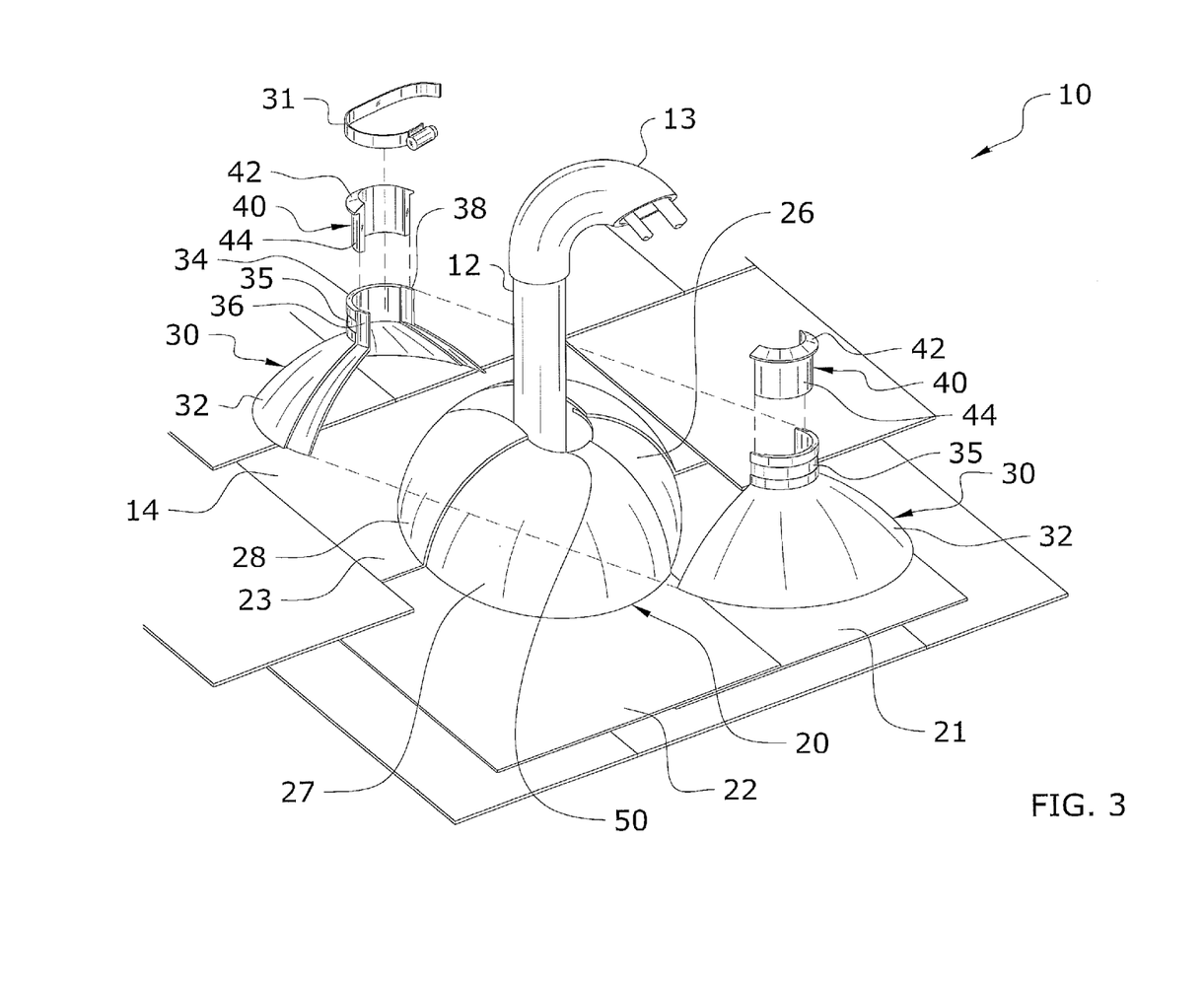
FIG. 3 is an exploded upper perspective view of the present invention with respect to the electrical conduit.

The conduit 12 extends upwardly from the roof 14 to provide an opening for electrical wiring and the like to pass through as shown in FIGS. 1 through 4. The conduit 12 may be comprised of various widths and lengths. The conduit 12 typically includes a masthead 13 that is comprised of a downwardly curved structure as shown in FIGS. 1 through 3 of the drawings. The electrical wires extend outwardly through the masthead 13 and to the electrical power grid that provides electrical power to the building structure.

C. Lower Cover.

Figure 4:
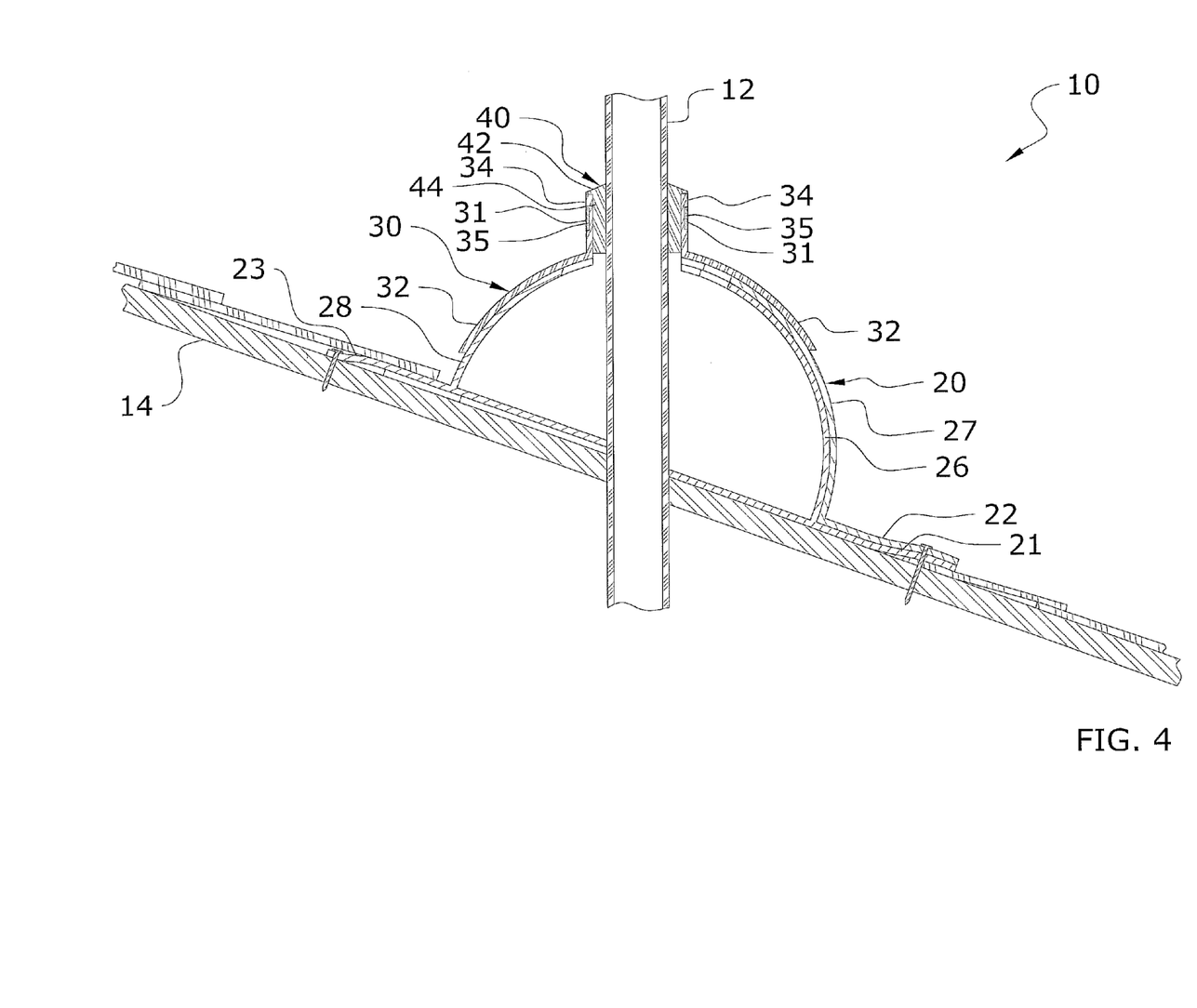
FIG. 4 is a side cutaway view taken along line 4-4 of FIG. 2 of the drawings.
Figure 5A:
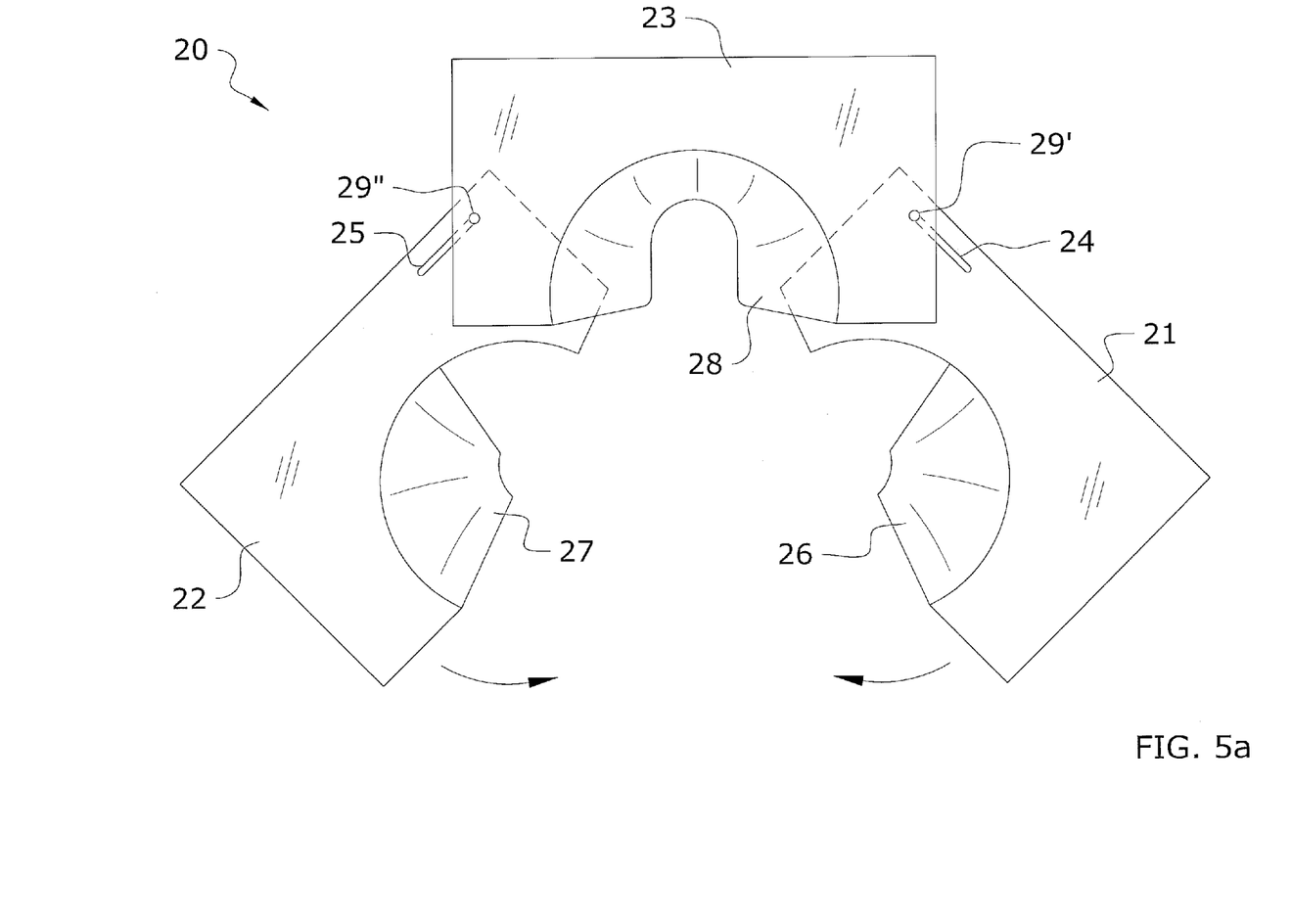
FIG. 5a is a top view of the lower cover in an opened state.
Figure 5B:
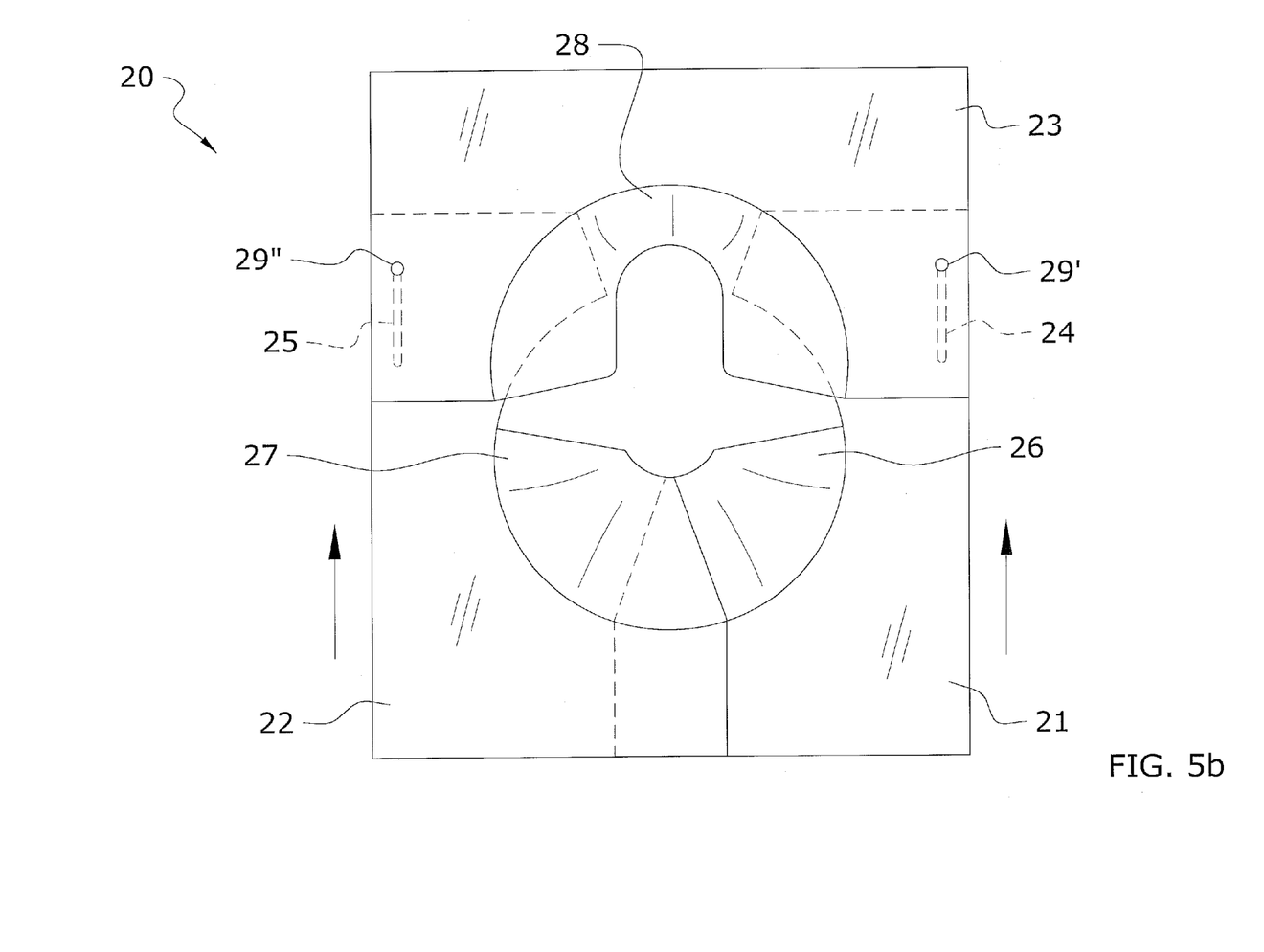
FIG. 5b is a top view of the lower cover in a semi-opened state.
Figure 5C:
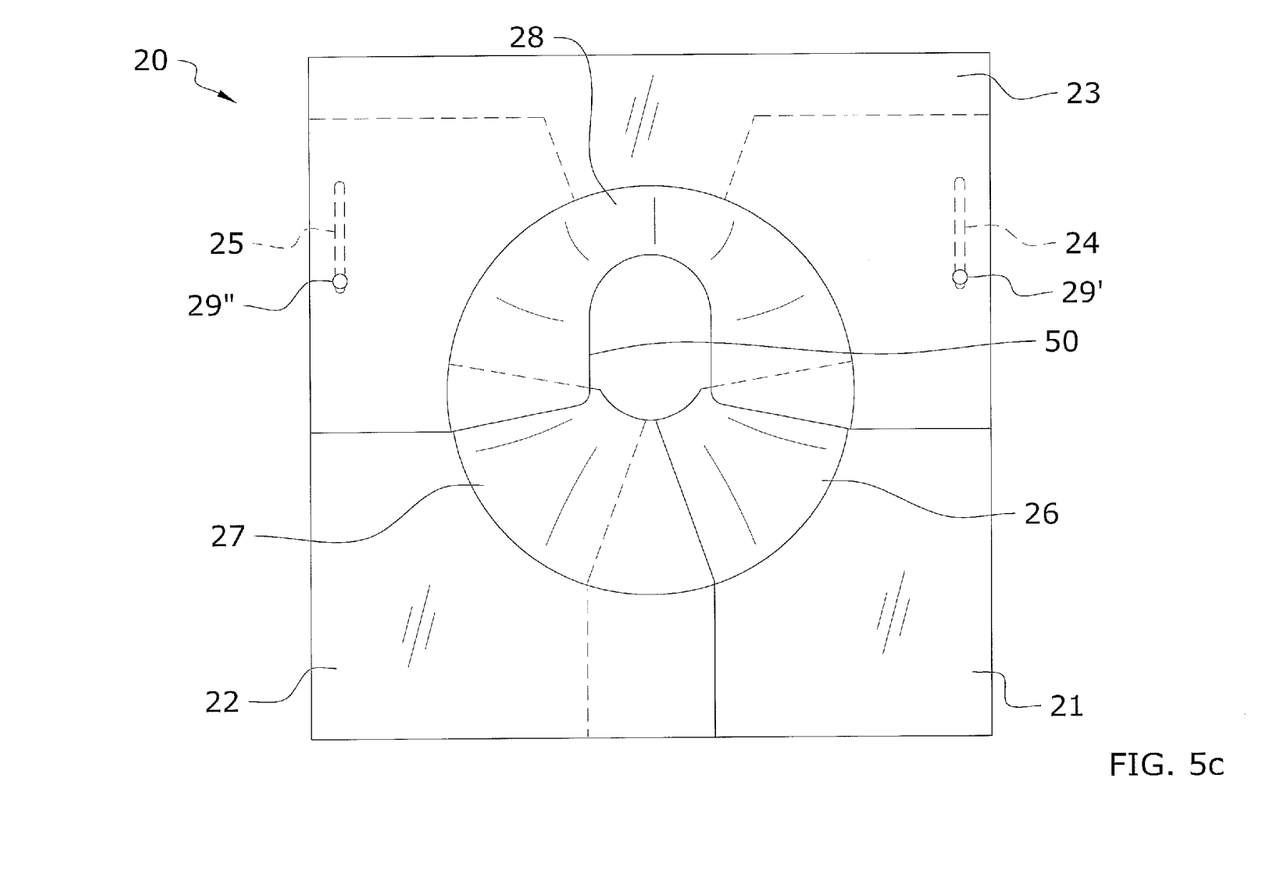
FIG. 5c is a top view of the lower cover in a closed state.

FIGS. 1 through 5c illustrate the lower cover 20 which is attached to the roof 14 and positioned about the conduit 12. The lower cover 20 defines a first opening 50 that receives the conduit 12 as illustrated in FIGS. 3 and 5c of the drawings. The first opening 50 is preferably comprised of an elongated slotted structure to allow for various pitches of roofs 14 (e.g. flat, 30 degrees, 50 degrees, etc.). The width of the first opening 50 is sufficient to receive most sizes of conduit 12 used for electrical wiring. The lower cover 20 is preferably comprised of a rigid material such as but not limited to metal or plastic.

The lower cover 20 is comprised of a flat portion attached to the roof 14 by a plurality of fasteners (e.g. nails, screws). The flat portion of the lower cover 20 is preferably comprised of a thin structure that is able to be secured beneath the roofing material such as asphalt shingles as illustrated in FIG. 4 of the drawings. The lower cover 20 further includes a substantially rounded dome portion that extends upwardly and substantially surrounds the conduit 12 as best illustrated in FIG. 3 of the drawings. The first opening 50 extends through the substantially rounded dome portion as further shown in FIG. 3 of the drawings.

As best illustrated in FIG. 5a of the drawings, the flat portion of the lower cover 20 is comprised of a first base 21 movably attached to a third base 23 and a second base 22 movably attached to the third base 23. The third base 23 is centrally positioned between the first base 21 and the second base 22 as illustrated in FIG. 5a of the drawings. The first base 21 and the second base 22 preferably include a first slot 24 and a second slot 25 respectively for receiving corresponding rivets 29 that extend through the third base 23. The rivets 29 extending through the slots 24, 25 allow for adjustment of the first base 21 and the second base 22 with respect to the third base 23 when positioning about the conduit 12 thereby accommodating various pitches of roofs 14.

As shown in FIGS. 3 through 5c of the drawings, the first base 21 preferably includes a first neck 26 extending upwardly, the second base 22 includes a second neck 27 extending upwardly and wherein the third base 23 includes a third neck 28 extending upwardly. The first neck 26, the second neck 27 and the third neck 28 form a substantially rounded structure that adjustably receives a lower portion 32 of the upper cover 30 when interconnected with one another forming the domed structure as shown in FIG. 3 of the drawings. The third neck 28 preferably overlaps both the first neck 26 and the second neck 27 as illustrated in FIGS. 3 and 4 of the drawings to provide a weather seal. The second neck 27 preferably overlaps the first neck 26 as illustrated in FIGS. 3 and 4 of the drawings.

The necks 26, 27, 28 each preferably have a curved upper edge as illustrated in FIG. 5a of the drawings. The third neck 28 preferably has a U-shaped slot as best illustrated in FIGS. 5a and 5b of the drawings.

D. Upper Cover.

The upper cover 30 is positioned above the lower cover 20 in an overlapping manner as best illustrated in FIGS. 2 and 4 of the drawings. The upper cover 30 defines a second opening 60 that receives the conduit 12. The upper cover 30 is preferably comprised of a flexible material such as but not limited to rubber wherein a clamp 31 secured about an upper portion 34 of the upper cover 30 seals the same about the exterior surface of the cover. A recessed portion 35 within the upper portion 34 of the upper cover 30 receives the clamp 31 (e.g. hose clamp 31) and ensures that the clamp 31 does not move over time by providing a secure seat for the clamp 31. The upper cover 30 may be comprised of a rigid material such as but not limited metal or plastic wherein it is preferably to utilize a grommet 40 as discussed herein.

The upper cover 30 is comprised of a first portion 33 and a second portion 37 that are connected to one another. The first portion 33 and the second portion 37 are preferably comprised of the same structure to reduce manufacturing costs as illustrated in FIG. 6 of the drawings.

The lower portion 32 of the upper cover 30 extends downwardly and outwardly in a tapering manner from the upper portion 34 as illustrated in FIGS. 1 through 4 and 6 of the drawings. The upper cover 30 preferably defines an interior cavity that is substantially rounded and that slidably receives the substantially rounded dome portion to allow the upper cover 30 to pivot about the lower cover 20 as illustrated in FIG. 4 of the drawings. It is preferable that the interior radius of curvature of the upper cover 30 is substantially equal to the outer radius of curvature for the lower cover 20 as illustrated in FIG. 4 of the drawings.

Figure 6:
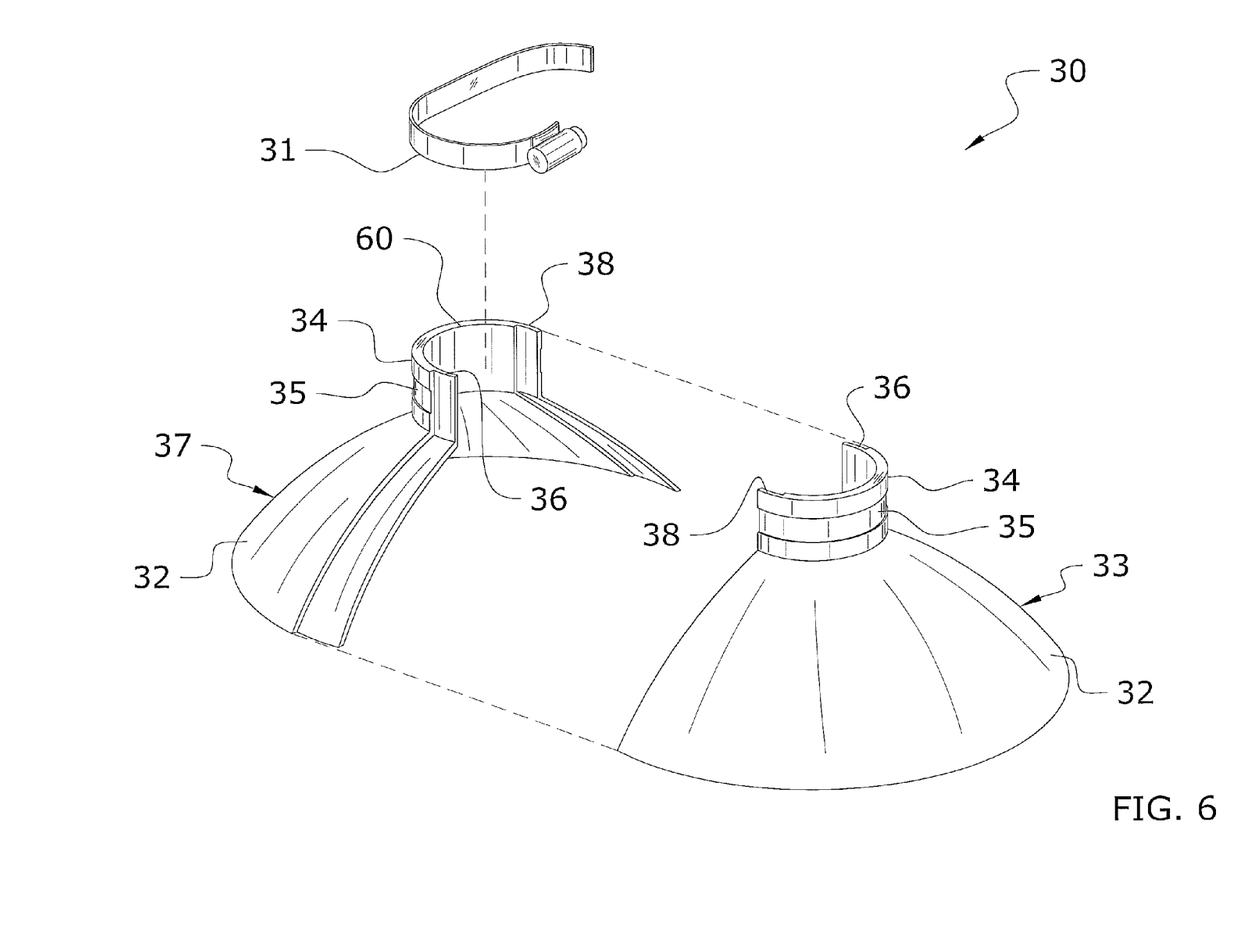
FIG. 6 is an exploded upper perspective view of the upper cover.

The first portion 33 and the second portion 37 each preferably include a first interlocking portion 36 and a second interlocking portion 38 on opposing sides as illustrated in FIG. 6 of the drawings. The first interlocking portion 36 of the first portion 33 mates with the second interlocking portion 38 of the second portion 37 and the second interlocking portion 38 of the first portion 33 mates with the first interlocking portion 36 of the second portion 37 to prevent water and wind from entering into the interior of the upper cover 30. The first interlocking portion 36 is preferably comprised of a recessed structure and the second interlocking portion 38 is preferably comprised of an overlapping structure that overlaps the first interlocking portion 36.

E. Grommet.

In addition to the upper cover 30, the user may utilize a grommet 40 where the second opening 60 does not form a seal about the conduit 12 (e.g. significant larger than the conduit 12 or a rigid material is used for the upper cover 30). The grommet 40 is preferably comprised of a first section and a second section.

The first section and the second section are each preferably comprised of the same C-shaped structure as illustrated in FIG. 3 of the drawings. The first section and the second section are formed to snugly fit about the exterior of the conduit 12 and into the space between the upper cover 30 and the conduit 12 as shown in FIG. 4 of the drawings. The grommet 40 is preferably comprised of a flexible material such as but not limited to rubber, but the grommet 40 may be comprised of a relatively non-flexible material such as plastic or metal.

The grommet 40 preferably includes a main body 44 having a tubular structure that fits within the second opening 60 and an upper flange 42 that covers the second opening 60 as best illustrated in FIG. 4 of the drawings. The length of the main body 44 may be comprised of any length sufficient to extend into the second opening 60. The main body 44 preferably has a width sufficient to snugly fit within the second opening 60. The main body 44 includes an opening that preferably snugly fits about the exterior surface of the conduit 12. Various sizes of grommets 40 may be utilized to accommodate various sizes of conduit 12 without having to change the size of the second opening 60 of the upper cover 30.

F. Operation of Preferred Embodiment.

In use, when applying a roofing material to a roof 14 with an existing conduit 12, the user positions the lower cover 20 so that the third neck 28 receives the conduit 12 and the opening within the third neck 28 is facing down the slope of the roof 14. The user then adjusts the position of the first base 21 and the second base 22 with respect to the third base 23 until the first neck 26 and the second neck 27 are positioned adjacent to the conduit 12 as shown in FIGS. 3, 5b and 5c of the drawings. After the lower cover 20 is properly positioned, fasteners are utilized to secure the lower cover 20 to the roof 14. The roofing material may be finished or delayed until the remaining installation of the present invention.

After the lower cover 20 is properly secured, the user then positions the first portion 33 and the second portion 37 of the upper cover 30 about the conduit 12 above the lower cover 20 as illustrated in FIGS. 2 and 3 of the drawings. It is important to ensure that the interior cavity of the upper cover 30 is properly positioned adjacent to the outer surface of the lower cover 20 as shown in FIG. 4 of the drawings. The ability of the upper cover 30 to move in various directions upon the lower cover 20 allows for the present invention to seal various types of conduit 12 on various pitches of roofs 14. After the upper cover 30 portions 33, 37 are properly positioned, the user then interlocks the first portion 33 to the second portion 37 with the second opening 60 receiving the conduit 12 as illustrated in FIG. 4 of the drawings. If the upper cover 30 is comprised of a flexible material, the clamp 31 is secured to the upper portion 34 of the upper cover 30 thereby forming a seal about the conduit 12. If there is a space between the second opening 60 and the conduit 12, an appropriately sized grommet 40 is positioned into the space until the upper flange 42 engages an upper edge of the upper cover 30 as shown in FIG. 4 of the drawings. A clamp 31 may still be utilized with a grommet 40.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. An electrical conduit flashing system, comprising:
   a lower cover defining a first opening that receives a conduit, wherein said lower cover is comprised of a first base movably attached to a third base and a second base movably attached to said third base;
   a first rivet and a second rivet positioned on said third base;
   a first slot formed on said first base for receiving said first rivet;
   a second slot formed on said second base for receiving said second rivet; and
   an upper cover defining a second opening that receives said conduit, wherein said upper cover is comprised of a first portion and a second portion that are connected to one another, wherein said upper cover is removably secured around said lower cover.

2. The electrical conduit flashing system of claim 1, wherein said upper cover is comprised of a flexible material.

3. The electrical conduit flashing system of claim 2, wherein said upper cover is comprised of rubber.

4. The electrical conduit flashing system of claim 1, wherein said upper cover is comprised of a tapering lower portion and an upper portion defining said second opening.

5. The electrical conduit flashing system of claim 4, including a clamp secured about said upper portion to secure said upper portion about said conduit.

6. The electrical conduit flashing system of claim 5, wherein said upper portion includes a recessed portion that receives said clamp.

7. The electrical conduit flashing system of claim 6, wherein said first portion and said second portion each include a first interlocking portion and a second interlocking portion, wherein said first interlocking portion of said first portion mates with said second interlocking portion of said second portion and wherein said second interlocking portion of said first portion mates with said first interlocking portion of said second portion.

8. The electrical conduit flashing system of claim 7, wherein said first interlocking portion is comprised of a recessed structure and wherein said second interlocking portion is comprised of an overlapping structure that overlaps said first interlocking portion.

9. The electrical conduit flashing system of claim 1, wherein said first opening is comprised of a slotted structure.

10. The electrical conduit flashing system of claim 1, wherein said first base includes a first neck extending upwardly, wherein said second base includes a second neck extending upwardly and wherein said third base includes a third neck extending upwardly, wherein said first neck, said second neck and said third neck form a substantially rounded structure that adjustably receives a lower portion of said upper cover.

11. An electrical conduit flashing system, comprising:
   a roof;
   a conduit extending upwardly from said roof, wherein said conduit includes a masthead;
   a length of electrical wire passing through said conduit and outwardly from masthead to an electrical power grid;
   a lower cover defining a first opening that receives said conduit, wherein said first opening is comprised of a slotted structure, and wherein said lower cover is comprised of a first base movably attached to a third base and a second base movably attached to said third base;
   a first rivet and a second rivet positioned on said third base;
   a first slot formed on said first base for receiving said first rivet;
   a second slot formed on said second base for receiving said second rivet;
   an upper cover defining a second opening that receives said conduit, wherein said upper cover is comprised of a first portion and a second portion that are connected to one another, wherein said upper cover is removably secured around said lower cover; and a grommet comprised of a first section and a second section, wherein said grommet includes a main body having a tubular structure that fits within said second opening and an upper flange that covers said second opening.

12. The electrical conduit flashing system of claim 11, wherein said upper cover is comprised of a rigid material.

13. The electrical conduit flashing system of claim 12, wherein said upper cover is comprised of metal.

14. The electrical conduit flashing system of claim 11, wherein said upper cover is comprised of a tapering lower portion and an upper portion defining said second opening.

15. The electrical conduit flashing system of claim 14, including a clamp secured about said upper portion to secure said upper portion about said conduit.

16. The electrical conduit flashing system of claim 15, wherein said upper portion includes a recessed portion that receives said clamp.

17. The electrical conduit flashing system of claim 16, wherein said first portion and said second portion each include a first interlocking portion and a second interlocking portion, wherein said first interlocking portion of said first portion mates with said second interlocking portion of said second portion and wherein said second interlocking portion of said first portion mates with said first interlocking portion of said second portion.

18. The electrical conduit flashing system of claim 17, wherein said first interlocking portion is comprised of a recessed structure and wherein said second interlocking portion is comprised of an overlapping structure that overlaps said first interlocking portion.

19. The electrical conduit flashing system of claim 11, wherein said first base includes a first neck extending upwardly, wherein said second base includes a second neck extending upwardly and wherein said third base includes a third neck extending upwardly, wherein said first neck, said second neck and said third neck form a substantially rounded structure that adjustably receives a lower portion of said upper cover.

20. An electrical conduit flashing system, comprising:
a roof;
a conduit extending upwardly from said roof, wherein said conduit includes a masthead;
a length of electrical wire passing through said conduit and outwardly from masthead to an electrical power grid;
a lower cover defining a first opening that receives said conduit, wherein said first opening is comprised of a slotted structure, and wherein said lower cover is comprised of a first base movably attached to a third base and a second base movably attached to said third base;
a first rivet and a second rivet positioned on said third base;
a first slot formed on said first base for receiving said first rivet;
a second slot formed on said second base for receiving said second rivet;
wherein said lower cover is comprised of a flat portion attached to said roof by a plurality of fasteners and a substantially rounded dome portion that extends upwardly and surrounding said conduit, wherein said first opening extends through said substantially rounded dome portion;
an upper cover defining a second opening that receives said conduit, wherein said upper cover is comprised of a first portion and a second portion that are connected to one another, wherein said upper cover is comprised of a flexible material, and wherein said upper cover is comprised of a tapering lower portion and an upper portion defining said second opening, wherein said upper cover is removably secured around said lower cover;
wherein said upper cover has an interior cavity that is substantially rounded and that slidably receives said substantially rounded dome portion to allow said upper cover to pivot about said lower cover;
a grommet comprised of a first section and a second section, wherein said grommet includes a main body having a tubular structure that fits within said second opening and an upper flange that covers said second opening; and
a clamp secured about said upper portion to secure said upper portion about said conduit;
wherein said upper portion includes a recessed portion that receives said clamp;
wherein said first portion and said second portion each include a first interlocking portion and a second interlocking portion, wherein said first interlocking portion of said first portion mates with said second interlocking portion of said second portion and wherein said second interlocking portion of said first portion mates with said first interlocking portion of said second portion;
wherein said first interlocking portion is comprised of a recessed structure and wherein said second interlocking portion is comprised of an overlapping structure that overlaps said first interlocking portion;
wherein said first base includes a first neck extending upwardly, wherein said second base includes a second neck extending upwardly and wherein said third base includes a third neck extending upwardly, wherein said first neck, said second neck and said third neck form a substantially rounded structure that adjustably receives a lower portion of said upper cover.

* * * * *